(12) United States Patent
Takaki

(10) Patent No.: US 6,632,332 B1
(45) Date of Patent: Oct. 14, 2003

(54) METHOD OF REINFORCING CATALYST REACTION

(75) Inventor: Atsushi Takaki, Fukuoka (JP)

(73) Assignee: Yugen Kaisha Kankyogijyutsu Kenkyusho, Fukuoka (JP)

( * ) Notice: Subject to any disclaimer, the term of this patent is extended or adjusted under 35 U.S.C. 154(b) by 0 days.

(21) Appl. No.: 09/869,992

(22) PCT Filed: Nov. 13, 2000

(86) PCT No.: PCT/JP00/08000

§ 371 (c)(1),
(2), (4) Date: Jul. 10, 2001

(87) PCT Pub. No.: WO01/34300

PCT Pub. Date: May 17, 2001

(30) Foreign Application Priority Data

Nov. 12, 1999 (JP) .............................. 11-322081

(51) Int. Cl.$^7$ .............................. C25B 5/00; C07C 1/00; B01J 19/12
(52) U.S. Cl. .............. 204/155; 204/157.15; 422/186.01
(58) Field of Search ............................ 204/155, 157.15; 422/186.01

(56) References Cited

U.S. PATENT DOCUMENTS

| | | | | |
|---|---|---|---|---|
| 4,588,577 A | * | 5/1986 | Cardinal | 423/657 |
| 5,756,207 A | * | 5/1998 | Clough et al. | 428/375 |

FOREIGN PATENT DOCUMENTS

| | | |
|---|---|---|
| JP | 3-43397 | 4/1991 |
| JP | 3-43397 U * | 4/1991 |
| JP | 9-57252 | 3/1997 |
| JP | 11-188356 | 7/1999 |
| JP | 2000-107567 | 4/2000 |
| JP | 2000-271490 | 10/2000 |

* cited by examiner

Primary Examiner—Edna Wong
(74) Attorney, Agent, or Firm—Paul & Paul

(57) ABSTRACT

A method is provided for enhancing the catalytic reaction, by disposing a semiconductor catalyst in a fluid which includes charged particles and generating a magnetic field in the space where the semiconductor catalyst is disposed so as to impart electromagnetic induction energy to the charged particles. This method is capable of carrying out the reduction of nitrogen oxides, dechlorination of organic chlorine compounds and other reactions efficiently.

13 Claims, 3 Drawing Sheets

(a)

(b)

METHOD OF REINFORCING CATALYST REACTION

TECHNICAL FIELD

The present invention relates to a method of enhancing a catalytic reaction and, more particularly, to a technique for a magnetic field catalyst process which utilizes magnetic field and charged particles to enhance catalytic reactions such as oxidation, reduction, denitrification, desulfurization and dechlorination by means of a semiconductor catalyst. This technology is useful for efficiently and economically processing chemical substances dissolved in gases or water in a large scale through such reactions as oxidation and reduction, and is applicable specifically to chemical plants, remedial operation for environmental pollution, water purification, deodorization, air purification and agricultural/livestock farms.

BACKGROUND ART

A technology to activate or reform a fluid (gas or liquid) by applying a magnetic field to the gas or liquid has been known in the prior art. A technology is also widely known by which a semiconductor catalyst such as titanium oxide is irradiated with ultraviolet radiation thereby to cause oxidation, reduction, denitrification, desulfurization and dechlorination between the catalyst surface and gas or liquid which makes contact with the surface (photocatalyst process).

However, the effect and reaction of these techniques, when applied individually, have been insufficient and can last for only a short period of time.

In the case of the photocatalyst process, in particular, it is essential to apply a sufficient amount of ultraviolet radiation to the catalyst surface for the catalytic reaction to take place. Large scale commercialization of this technique has been hindered by such hurdles as various factors that hamper the efficient transmission of the ultraviolet radiation energy to the catalyst surface (stain on the catalyst surface, dispersion of light by fine particles, absorption and/or attenuation of the light energy by liquid phase, etc.) and low energy efficiency (catalytic effect per unit radiation energy).

DISCLOSURE OF INVENTION

The present invention aims at combining the prior art technologies of magnetic activation of a fluid and optical catalyst process to overcome the drawbacks of both technologies. Specifically, the present invention provides a method of enhancing the catalytic reaction of a semiconductor which is capable of making maximum use of the catalyst power of the semiconductor and sustaining the power, by utilizing the electromagnetic induction energy imparted to charged particles which move in a magnetic field for the purpose of augmenting the catalytic reaction. Particularly it is intended to provide methods for reducing nitrogen oxides and dechlorinating organic chlorine compounds effectively by applying the technology of the present invention.

The present invention, which solves the problems described above, provides a method of enhancing the catalytic reaction, which comprises disposing a semiconductor catalyst in a fluid which includes charged particles, generating a magnetic field in the space wherein the semiconductor catalyst is disposed to impart electromagnetic induction energy to said charged particles, thereby enhancing the catalytic reaction of the semiconductor catalyst and a catalytic reaction apparatus comprising a semiconductor catalyst layer, a fluid supplying and discharging means which introduces a fluid including charged particles to the catalyst layer and discharges the fluid, and a magnetic field generator which generates a magnetic field in the fluid.

According to the present invention, charged, particles are preferably included in a fluid, which may be a gas or a liquid and makes contact with a semiconductor catalyst, and a magnetic field is generated in the space of the semiconductor catalyst where the fluid flows at a predetermined velocity, thereby imparting electromagnetic induction energy (Lorentz force) to the charged particles as shown in FIG. 4($a$) and ($b$). The energy imparted to the charged particles is transferred to the catalyst when the particles make contact therewith, thereby enhancing the catalyst power and causing various reactions (oxidation, reduction, denitrification, desulfurization and dechlorination) to proceed efficiently.

The same effect can be achieved not only by moving the charged particles in the magnetic field but also by applying ultrasonic vibration to a fluid contained in a vessel such as reactor thereby oscillating the particles.

The semiconductor catalyst used in the present invention may be selected in accordance to the intended catalytic reaction from among oxides such as $TiO_2$ (titanium dioxide), $ZnO$, $Nb_2O_5$, $SrTiO_3$, $PbNb_2O_6$ and $K_4Nb_6O_{17}$, sulfides such as $CdS$ and $ZnS$, and organic polymer such as polyparaphenylene.

Among these, an dxide semiconductor is most preferably used and titanium oxide which undergoes oxidizing and reducing reactions is specifically preferable.

Charged particles carried by the, fluid may be the following substances. Nitrogen oxides, sulfur oxides, ozone and odor components, for example, may be used as the charged particles carried by the gas, For the charged particles carried by the liquid, nitrogen oxides; organic chlorine compounds such as trichloroethylene, tetrachloroethylene, trichloroethane, dioxins and trihalomethane; Na and Mg ions; and various artificial chemical substances may be used. Water molecules, which have polarity and can be regarded as charged in a broader sense of the word, may also be used as the charged particles according to the present invention. A molecule having localized electron distribution may be regarded the charged particle according to the present invention. These charged particles may not necessarily be subject to catalytic reaction.

The magnetic field used in the present invention may be either one-way magnetic field (DC magnetic field) or alternating magnetic field. Catalyst power of the oxide semiconductor is,enhanced by alternating the direction of the magnetic field at a high frequency. The magnetic field may be generated by either electromagnets or permanent magnets, which are arranged around or in a fluid path thereby to apply the magnetic field to the oxide semiconductor. The intensity of the magnetic field is preferably not less than 0.1 Tesla (1000 Gauss).

Methods for imparting kinetic energy to the charged particles are classified roughly into three types. The first is to cause the charged particles to undergo linear or circular movement unidirectionally (for example, by means of fluid pressure). The second is to excite the charged particles by ultrasonic or microwave energy so as to undergo random motion. The third is to move the charged particles through collision with the catalyst and viscosity of the catalyst surface by moving the semiconductor catalyst (for example, the semiconductor catalyst is caused to undergo rotation, reciprocal or random motion in the space occupied by the charged particles). The energy source for moving the charged particles may be (1) fluid pressure applied to the fluid, (2) various natural energy sources (potential energy, wind power, wave power, tidal wave energy, etc.), and (3) artificially generated energy (electric motor, internal combustion engine, ultrasound, microwave, etc.).

The semiconductor catalyst such as titanium dioxide ay be selected by giving consideration to the following factors.

(1) Catalyst Size

The catalyst is preferably made of small particles with a large surface area, although a bulk catalyst such as a sheet or a block may also be used.

(2) A Compound Selected to Best Suit the Intended Catalytic Reaction.

It is known that a compound of titanium dioxide and lead has a higher efficiency of generating methane from $CO_2$ through photocatalytic reaction (carbon dioxide assimilation) about 30 times that of titanium dioxide only, and it is possible to decompose water into hydrogen and oxygen by ultraviolet radiation energy. (decomposition of water) by having ruthenium carried by barium tetratitanate. Based on various experiences and technologies acquired on the optical catalyst processes which employ oxide semiconductors or the like, a suitable compound can be selected for the intended catalytic reaction thereby to achieve the intended catalytic reaction more efficiently than in the prior art. This process may also be combined with the irradiation with light, as a matter of course.

(3) Combined Use of Other Catalysts

Catalyst power can be enhanced by combining activated carbon or iron oxide with the oxide semiconductors such as titanium dioxide.

(4) Combined Use of pH Control

Catalytic reaction of the present invention can be enhanced further by adding acid or alkali to the fluid so as to control the pH value to an optimum level.

(5) Catalytic Reaction Can be Enhanced By Adding $H_2O_2$, Ozone or $O^-_3$ to the Fluid, Thereby Increasing the Free Radicals Generated.

In order to put the present invention into practical operation, a catalytic reaction apparatus is used which comprises a semiconductor catalyst layer, a fluid supplying and discharging means that introduces a fluid including charged particles to the, catalyst layer and discharges the fluid, and a magnetic field generator which generates a magnetic field in the fluid. While the semiconductor catalyst layer may be disposed in a fluid passage or a tank such as a reaction vessel the catalyst layer may be of any proper type such as fixed bed or fluidized bed. There is also no limitation to the fluid supplying and discharging means which may be, for example, a pump. While there is no limitation to the magnetic field generator, one that is capable of applying an alternating-magnetic field is preferable as described above.

The present invention, which is capable of enhancing the catalyst power of the semiconductor and sustaining the power, can be applied to various fields as follows.

1. Organic chemical synthesis and decomposition plants in general.
2. Preventive and remedial measures against environmental pollution
    (1) Denitrification, desulfurization and dechlorination of exhaust gas discharged from automobiles and waste incineration
    (2) Denitrification, desulfurization and dechlorination of domestic waste water, industrial waste water, water discharged from industrial waste processing facility and water discharged from sewage treatment facility, removal and detoxification of various synthesized chemical substances.
    (3) Remedial measures against eutrophication of lake, river, pond and seawater (denitrification, desulfurization, etc.)
    (4) Efficient removal of various synthesized chemical substances from lake, river, pond and seawater and soil.
    (5) A system to synthesize methane from carbon dioxide by means of natural energy, developed as countermeasure against global warming.
3. Health and sanitary applications
    (1) Water purification (improving the water quality, removal and detoxification of various artificial substances) in public water works and privately owned purifying facilities (office building, hotel, hospital, home, etc.)
    (2) Decomposition and/or removal of harmful substances (chlorine, trihalomethane, endocrine disrupters, etc.) included in potable water supply.
    (3) water purification for swimming pool and public bath.
    (4) Air purifier which combines deodorizing and sterilizing functions
4. Application to industrial process
    (1) Supply of purified water or magnetically activated water for agriculture (stock breeding, poultry farming, horticulture, etc.)
    (2) Water purification system for fish tank
    (3) Supplying hydrogen fuel for fuel cell by means of a water decomposition system utilizing natural energy

BEST MODE FOR CARRYING OUT THE INVENTION

Examples of the present invention will be described below with reference to accompanying drawings and data, but it should be noted that the present invention is not limited to the following Examples.

Figure 1:
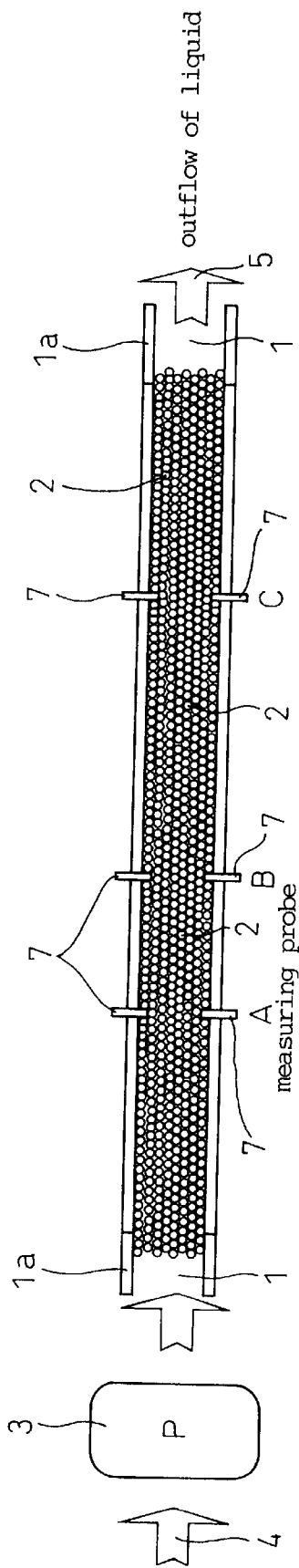
FIG. 1 shows the structure of an apparatus for embodying the present invention without a magnetic field being applied according to Examples 1 to 3.

FIG. 1 shows the structure of the apparatus for embodying the present invention without a magnetic field being applied according to Examples 1 to 3.

Figure 2:
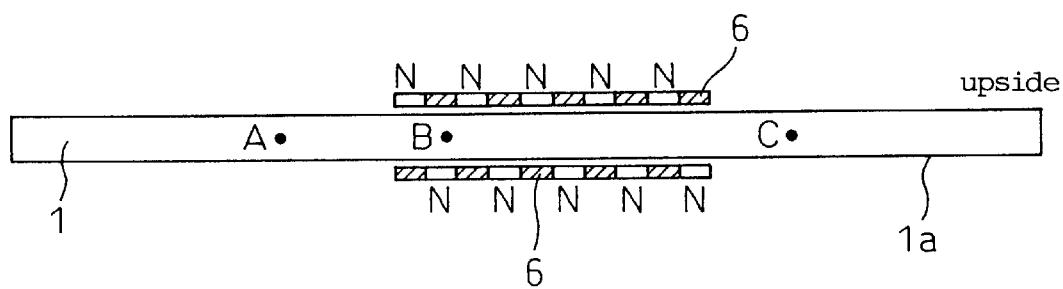
FIG. 2 illustrates the arrangement of magnets and measuring points in the apparatus according to Examples 1 to 3.
Figure 3:
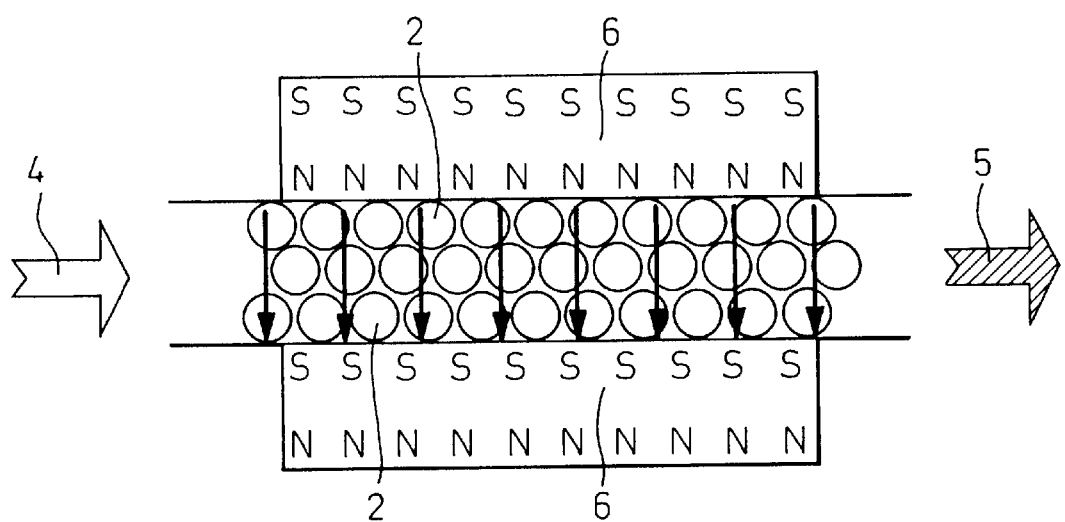
FIG. 3 schematically shows the principle of the present invention.
Figure 4:
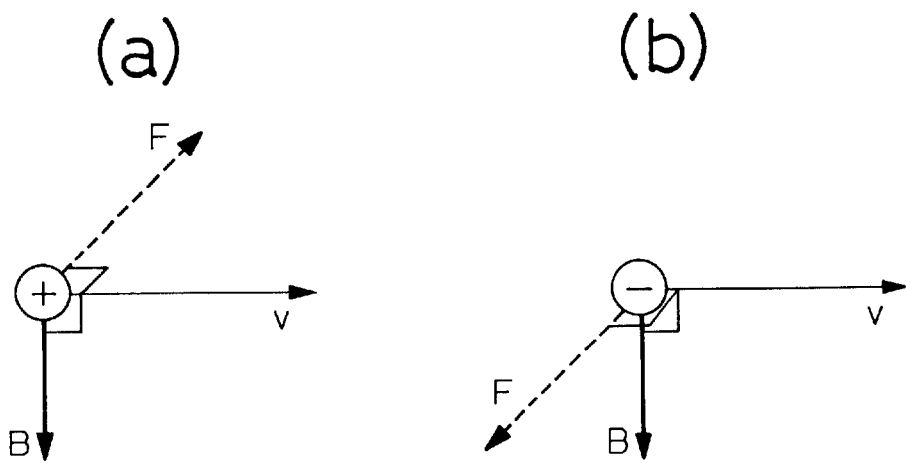
FIG. 4 explains the Lorentz force according to the present invention.

FIG. 2 illustrates the arrangement of the magnets and the measuring points in the apparatus according to Examples 1 to 3.

Examples 1 to 3 are examples of arranging neodymium magnets (Nd-Fe-B magnets) having surface magnetic flux density of 4,000 Gauss so as to surround a fluid passage which is filled with a semiconductor catalyst in the form of titanium dioxide particles, while a stock solution is sent through the fluid passage under pressure to activate the stock solution through oxidizing and reducing reactions of the titanium dioxide, thereby purifying the stock solution.

In FIGS. 1 and 2, the reference numeral 1 denotes a passage for passing the stock solution, 1a denotes a stainless pipe which forms the fluid passage and is 37 mm wide, 15 mm high and 1,000 mm long with wall thickness of 1.5 mm. The reference numeral 2 denotes titanium dioxide pellets which are an oxide semiconductor, 3 denotes a pump which forces the stock solution 4 to flow through the fluid passage at a low flow rate of 1.9 liters/min. or a high flow rate of 5.4 liters/min., 4 denotes the stock solution to be processed, 5 denotes outflow of a liquid processed by activation, 6 denotes neodymium magnets having surface magnetic flux density of 4,000 Gauss, and 7 denotes several sets of induced electromotive force measuring probes placed at a distance of 2.5 cm and opposite to each other. Measurements are taken at three points of A, B and C in the fluid passage 1. Point A is located at 25cm from the inlet of the fluid passage 1, point B is located at 40 cm from the inlet and point C is located at 75 cm from the inlet. (Electromagnetic induction energy)

Now the principle of generating the electromagnetic induction energy by the magnetic field and the charged particles according to the present invention will be described below. A charged particle moving in a magnetic field receives a force called the Lorentz force. When the charged particle enters a uniform magnetic field at right angles, the particle receives the Lorentz force (electromagnetic induction energy) which is perpendicular to both the magnetic field and the moving direction of the charged particle. The force F is given as the product of charge q of the charged particle, velocity v of the charged particle and the magnetic flux density B as follows.

$$F = qvB \quad (1)$$

Voltage generated across a pair of electrodes is given as:

$$et = es + (EL) = es + ((V \times B)L) \quad (2)$$

where es is an electrostatic potential, E is electric field vector generated by a flow, L is the distance between the two electrodes placed in the magnetic field, V is the flow vector of the fluid and B is the magnetic field vector.

An energy gained by an electron through acceleration by a potential difference of 1V, denoted 1eV, is $1.6 \times 10^{-19}$ j which can be converted into temperature by dividing with the Boltzmann constant $k = 1.38 \times 10^{-23}$ $JK^{-1}$ as follows.

$$1eV = 11,588.3 \text{ K} = 11,315° \text{ C}. \quad (3)$$

The following description shows how much electromotive force will be generated by the magnetic activation according to the present invention. The induced electromotive force was measured twice at each of the points A, B and C shown in FIGS. 1, 2 using tap water as the stock solution while changing the flow velocity. Mean value of the measurements at each point is shown in Table 1. Major charged particles included in the tap water are $Na^+$, $Mg^{++}$, $Cl^+$ ions and the like.

TABLE 1-1

Without magnet induced electromotive force measured (unit: mV)

| Measuring point | Flow velocity 0 | Low speed | High speed | Low speed - 0 velocity | High speed - 0 velocity |
|---|---|---|---|---|---|
| A | −5.5 | −6.5 | −11.0 | −1.0 | −5.5 |
| B | 0.5 | −3.0 | −10.0 | −3.5 | −10.5 |
| C | −7.5 | −0.5 | −2.0 | 7.0 | 5.5 |

TABLE 1-2

With magnets induced electromotive force measured (unit: mV)

| Measuring point | Flow velocity 0 | Low speed | High speed | Low speed - 0 velocity | High speed - 0 velocity |
|---|---|---|---|---|---|
| A | −10.0 | −6.0 | −8.0 | 4.0 | 2.0 |
| B | 189.0 | 149.5 | 120.0 | −39.5 | −69.0 |
| C | −9.0 | −3.5 | 6.0 | 5.5 | 15.0 |

From the results described above, the following findings were obtained.

1. Basic value of the electromotive force is varied significantly simply by applying the magnetic field to the fluid passage 1. This is supposedly due to the electromotive force generated because the distribution of the charged particles in the water is modified by the strong magnetic field.

2. When water is forced to flow by the pump 3, the electromotive force changes significantly depending on the flow velocity. This is supposedly due to the electromotive force generated by the electromagnetic induction energy (Lorentz force) because the kinetic energy is transferred to the charged particles existing in the magnetic field.

3. The electromagnetic energy generated at this time (value measured at point B in the table of the case provided with the magnets −69.0) is translated to a temperature increase by the equation (3) as follows.

$$11,315° \text{ C.} \times 69/1000 = 780.7° \text{ C.}$$

(Catalyst for oxidizing and reducing reactions)

In the photocatalyst systems of the prior art which employs oxide semiconductors such as titanium dioxide, it has been necessary to have a sufficient intensity of optical energy directly reach the catalyst surface. In contrast, the present invention, which is based on the fact that the electromagnetic induction energy and the optical energy, that is a kind of electromagnetic radiation, are essentially the same in nature, makes it possible to effect photocatalytic reaction and chemical reaction as a part of the electromagnetic induction energy, carried by the charged particles, is transferred to the oxide semiconductors even in a water solution or in a closed space which cannot be penetrated sufficiently by the light. This phenomenon may also be used in combination with optical energy of ultraviolet radiation, or the like.

EXAMPLE 1

Denitration Reaction Using Magnetic Field Catalyst

Denitration reaction is verified by measuring the concentrations of nitrous acid and nitric ion in the processed liquid 5 after the magnetic field catalyst processing in cases A, B and C, using the apparatus shown in FIGS. 1, 2 and sodium nitrate solution as the stock solution 4.

1. Sodium nitrate solution having concentration of 10 mg/liter (10 ppm) (maximum permissible concentration for water quality of public water works) is prepared as the stock solution 4.

2. An experimental system similar to that of the test shown in Tables 1–1 and 1–2 is used to measure the nitric acid ion concentration in the processed liquid after the magnetic field catalyst processing by means of high performance liquid chromatography (HPLC), with the specimen being separated, caused to undergo grease reaction and finally quantitatively determined by means of the intensity of color developed through a diazo reaction. In the following description, NOx concentration is given in terms of the integration of voltage output from a light absorbance detector (peak area).

Case A: Peak area of NOx detected from the solution prior to the magnetic field catalyst processing (stock solution 4) which includes 10 ppm of sodium nitrate.

Case B: Peak area of NOx when processed in a system which is not provided with magnets Case C: Peak area of NOx in the case of magnetic field catalyst processing provided with magnets.

The results are shown in Table 2.

TABLE 2

|  | $NO_2^-$ concentration mVs | $NO_3^-$ concentration mVs | $NO_{2+3}^-$ concentration mVs | Residue ratio % |
|---|---|---|---|---|
| Case A | 0 | 5220 ± 81 | 5220 | * |
| Case B (without magnets) | 511 ± 80 | 4550 ± 264 | 5061 | 97.0 |
| Case C (with magnets) | 68 ± 25 | 4117 ± 720 | 4180 | 80.1 | n = 4

From the results described above, the following findings are obtained.

1. While about 10% of $NO^{-3}$ was transformed into $NO^{-2}$, there was no change observed in the total NOx in the case no magnets were installed.

2. When magnets were installed, about 20% of the total nitrogen oxides was eliminated in a single run of the magnetic field catalyst processing. This result clearly shows that activation by the magnetic field is necessary for the catalyst system of the present invention to function effectively.

3. Dramatic denitration effect can be expected by making this system in a multiple stage construction or circulating configuration.

EXAMPLE 2

Dechlorination By Means of Magnetic Field Catalyst

Pentachlorophenol (PCP) concentration in the processed water was measured in cases D and E using the apparatus shown in FIGS. 1, 2 and the PCP as the stock solution 4, and dechlorinating reaction was verified.

1. PCP solution having concentration of 5 mg/liter (5 ppm) is prepared as the stock solution 4.

2. PCP concentration in the processed water 5 after the magnetic field catalyst processing is measured using high performance liquid chromatography (HPLC) and an electrochemical instrument in an experiment system similar to that of the test described above.

Case D: Peak area of PCP detected from the solution prior to the magnetic field catalyst processing (,stock solution 4) which includes 5 ppm of PCP.

Case E: Peak area of PCP detected from the solution which has been processed by the magnetic catalyst system.

The results are shown in Table 3.

TABLE 3

|  | PCP concentration mVs | Residue ratio % |
|---|---|---|
| Case D | 20300 ± 260 | * |
| Case E | 15179 ± 647 | 74.8% | n = 4

From the results described above the following findings are obtained.

1. About 25% of PCP was eliminated in a single run of the magnetic field catalyst processing by applying the method of the present invention. As it was verified, by a test paper method, that the residual chlorine concentration in the solution which has been subjected to the magnetic field processing (processed liquid 5) showed a statistically significant increase, it was assumed that the elimination of PCP was caused by the dechlorinating reaction.

2. Dramatic dechlorination effect can be expected by making this system part of a multiple stage construction or circulating configuration.

3. PCP is a typical organic chlorine compound which has features common to dioxins and PCB, and it is expected that other organic chlorine compounds will also be dechlorinated.(neutralized) efficiently.

EXAMPLE 3

Enhancement of Magnetic Field Catalyst (Denitrating Reaction)

In the apparatus shown in FIGS. 1, 2, the fluid passage 1 is filled with a mixture of (1) titanium dioxide particles having diameter of 0.2 mm, (2) activated carbon particles having diameter of 0.2 mm and (3) magnetite particles having diameter of 5 mm which are mixed in proportion of 1:1:4 by volume. Similarly to Example 1, water including nitric ion (stock solution 4) is forced to flow by the pump 3, and the change in the nitric ion concentration is measured.

| Results 1. Electromotive force at point B | |
|---|---|
| Without magnets | |
| Flow velocity: 0 | +5 mV |
| Flow velocity: 1.7 L/min. | −50 mV |
| Difference in electromotive force | −55 mV |
| Provided with magnets | |
| Flow velocity: 0 | +20 mV |
| Flow velocity: 1.7 L/min. | −100 mV |
| Difference in electromotive force | −120 mV |

| Result 2. Change in nitric ion concentration | | |
|---|---|---|
| Solution includ- | $NO_2^-$ | 1.3 mVs |

-continued

| | | | |
|---|---|---|---|
| ing 20 ppm of ion (Stock solution 4) | | $NO^-_3$ | 11,603 mVs (Residue ratio) |
| Solution after process | No magnets (Processed solution 5) | $NO^-_2$ $NO^-_3$ | 1.1 mVs 6,370 mVs (59.4%) |
| | With magnets | $NO^-_2$ $NO^-_3$ | 1.5 mVs 4,010 mVs (34.6%) |

From the results described above, the following findings are obtained.

1. Induced electromotive force energy is increased and the denitration effect becomes conspicuous by making the size of the titanium dioxide particles smaller and adding the activated carbon and the magnetite.

2. This Example suggests the possibility of further enhancing the oxidizing and reducing reactions by combining a known method of enhancing the photocatalytic reaction with the magnetic field catalyst method of the present invention.

EXAMPLE 4

Magnetic Field Catalyst Assisted By Ultrasound

Experiment Procedure

Figure 5:
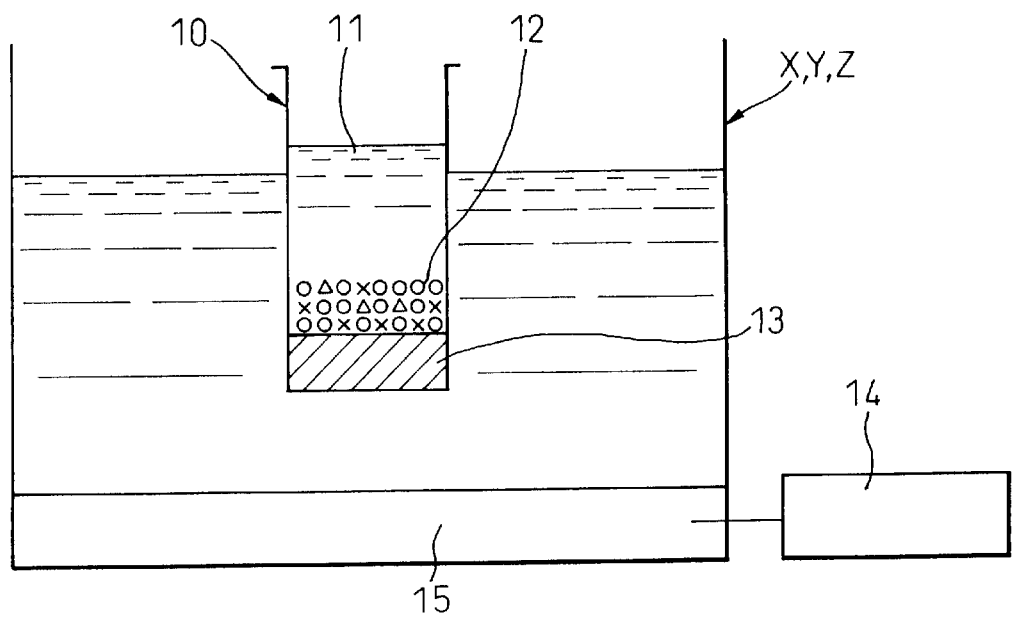
FIG. 5 shows Example 4 of the present invention.

1. Brown-colored glass cylinders 10 (100 ml capacity) were filled with stock solution 11, 80 ml of 5 ppm $NO^{-3}$ solutions having different pH values (pH 3, 6, 9), as shown in FIG. 5. A catalyst 12 of the same material as that used in Example 3, comprising one gram of titanium dioxide particles, one gram of activated carbon particles and five grams of magnetite were. immersed in the solution. A neodymium magnet 13 (4,000 Gauss) was attached to the bottom of the glass cylinder 10 from the outside.

2. Water tanks X, Y, Z provided with ultrasonic generators operating at various wavelengths and output power levels described below were prepared. The glass cylinders 10 prepared in step 1 were immersed in the water tanks X, Y, Z and ultrasound was generated for a predetermined period of time, with the concentrations of nitrogen oxides being measured before and after the application of the ultrasound. In FIG. 5, reference numeral 14 denotes an ultrasound generator, 15 denotes an ultrasonic transducer installed at the bottom of the tank X, Y or Z.

| | Ultrasonic frequency | Output power | Energy |
|---|---|---|---|
| Tank X | 38 KHz | 600 W | 1 W/cm² |
| Tank Y | 150 KHz | 1200 W | 2.5 W/cm² |
| Tank Z | 770 KHz | 2400 W | 2.5 W/cm² |

The following results were obtained.

| | Duration | $NO^-_2$ concentration | $NO^-_3$ concentration | Total NOx concentration |
|---|---|---|---|---|
| | | Tank X | | |
| <pH 3> | 0 min | 1.3 mVs | 2048 mVs | 2049 mVs |
| | 10 min | 32.3 mVs | 1514 mVs | 1546 mVs |
| | 20 min | 35.9 mVs | 1383 mVs | 1419 mVs |
| <pH 6> | 0 min | 3.5 mVs | 2727 mVs | 2730 mVs |
| | 10 min | 43.7 mVs | 1989 mVs | 2032 mVs |
| | 20 min | 47.9 mVs | 1977 mVs | 2025 mVs |
| <pH 9> | 0 min | 3.8 mVs | 3413 mVs | 3417 mVs |
| | 10 min | 10.7 mVs | 3230 mVs | 3241 mVs |
| | 20 min | 13.9 mVs | 3081 mVs | 3095 mVs |
| | | Tank Y | | |
| <pH 3> | 0 min | 0.7 mVs | 2384 mVs | 2385 mVs |
| | 10 min | 418.7 mVs | 1817 mVs | 2236 mVs |
| | 20 min | 689.1 mVs | 1557 mVs | 2246 mVs |
| <pH 6> | 0 min | 1.6 mVs | 2046 mVs | 2048 mVs |
| | 10 min | 34.5 mVs | 1870 mVs | 1905 mVs |
| | 20 min | 268.9 mVs | 1637 mVs | 1906 mVs |
| <pH 9> | 0 min | 2.0 mVs | 2877 mVs | 2879 mVs |
| | 10 min | 428.0 mVs | 3277 mVs | 3705 mVs |
| | 20 min | 763.2 mVs | 3519 mVs | 4282 mVs |
| | | Tank Z | | |
| <pH 3> | 0 min | 2.0 mVs | 1728 mVs | 1730 mVs |
| | 10 min | 1.2 mVs | 2053 mVs | 2054 mVs |
| | 20 min | 2.7 mVs | 1572 mVs | 1575 mVs |
| <pH 6> | 0 min | 1.5 mVs | 2874 mVs | 2876 mVs |
| | 10 min | 3.6 mVs | 500 mVs | 2504 mVs |
| | 20 min | 2.8 mVs | 2133 mVs | 2136 mVs |
| <pH 9> | 0 min | 4.8 mVs | 3141 mVs | 3145 mVs |
| | 10 min | 7.3 mVs | 3237 mVs | 3244 mVs |
| | 20 min | 7.4 mVs | 3315 mVs | 3322 mVs |

From the results described above, the following findings were obtained.

1. The following tendencies were observed.

(1) The lower the pH value, the greater the effects of absorbing and decomposing total nitrogen oxides. When evaluated in terms of total nitrogen oxides dissolved in the solution, the denitration effect was highest at low frequency (38 kHz) followed by high frequency (770 kHz).

(2) At an intermediate frequency (150 kHz), no change was observed in the total nitrogen oxides but an increase in the $NO^-_2$ concentration dependent on the imparted energy was observed in the solutions of pH 3 and pH 6. In the solution of pH 9, the total nitrogen oxides showed an increase. These results indicate that, at the intermediate frequency, not only the reactions of deriving $NO^-_2$ from $NO^-_3$ but also the reactions of deriving $NO^-$ and $NO^-_2$ from nitrogen and oxygen which are dissolved in the solution take place.

2. In the case of the magnetic field catalytic reaction assisted by ultrasonic energy, denitrating reaction (reducing reaction) seems to be dominant in the low and high frequencies, while derivation of sulfate ions (oxidizing reaction) from the dissolved gas is predominant at the intermediate frequency. This means that dominance of the oxidizing reaction or the reducing reaction varies depending on the magnetic field catalyst conditions. Based on this fact, it is supposed that (1) ultrasonic vibration at a low or a high frequency is effective in removing the nitrogen oxides from the aqueous solution and (2) ultrasonic vibration at intermediate frequency is effective in oxidizing and adsorbing nitrogen monoxide in the air.

3. It has been known from literature that water molecules decompose when irradiated with ultrasound thus generating hydroxy radical "OH" (activated oxygen) and activated hydrogen "H·" (Makino et al., Radiat. Res., 96, 416–521, 1983). With the magnetic field catalyst method, it is supposed that the oxidizing and reducing reactions are carried out by the efficient use of the hydroxy radical "OH·" (activated oxygen) and activated hydrogen "H·" generated at this time.

Effects of the Invention

According to the present invention, as described above, electromagnetic induction energy can be imparted efficiently to all charged particles in the fluid, and chemical reactions by means of the semiconductor catalyst (oxidation, reduction, denitrification, desulfurization and dechlorination) can be carried out efficiently by bringing the charged particles in the excited state into contact with the semiconductor catalyst.

The magnetic field catalyst system of the present invention also has the following advantages.

(1) The construction is very simple, and a large apparatus for industrial application or a small apparatus for home use can be designed and manufactured relatively easily, provided that an apparatus (pump) for applying kinetic energy to the magnets and the fluid is available.

(2) Since the catalytic effect is utilized, the effect can be sustained over an extended period of time, allowing easy maintenance and reduced cost.

The present invention also makes the following operations possible, thus making great contributions to the conservation of global environment and human welfare:

(1) Neutralization and removal of artificial chemical substances such as endocrine disruptors and detergents discharged into the natural environment.

(2) Remedial measures to mitigate the effects of acid rain and eutrophication caused by waste water from farms and domestic waste water.

(3) Dechlorination (neutralization) treatment of organic chlorine compounds discharged in large quantity from waste processing facility or industrial waste processing facility.

(4) Purification of potable water.

What is claimed is:

1. A method of enhancing a catalytic reaction, which comprises disposing a semiconductor catalyst in a fluid which includes charged particles, and generating a magnetic field in the space wherein the semiconductor catalyst is disposed to impart electromagnetic induction energy to said charged particles, thereby enhancing the catalytic reaction of the semiconductor catalyst, wherein kinetic energy is imparted to the charged particles by means of ultrasonic energy in the magnetic field.

2. The method according to claim 1, wherein the kinetic energy is imparted to the fluid.

3. The method according to claim 1, wherein the space wherein semiconductor catalyst is disposed is a fluid passage or a tank.

4. The method according to claim 1, wherein the semiconductor catalyst is an oxide semiconductor catalyst.

5. The method according to claim 4, wherein the oxide semiconductor catalyst includes titanium dioxide.

6. The method according to claim 5, wherein the titanium dioxide is used along with activated carbon and magnetite.

7. The method as according to claim 1, wherein the magnetic field is an alternating magnetic field.

8. The method as according to claim 1, wherein the magnetic field has an intensity of at least 0.1 tesla.

9. The method according to claim 1, 2, 3, 4, 5, 6, 7 or 8, wherein the catalytic reaction is dechlorination of organic chlorine compounds included in the fluid.

10. The method according to claim 1 wherein the catalytic reaction is reduction of nitrogen oxides included in the fluid.

11. A method of enhancing a catalytic reaction, which comprises disposing a semiconductor catalyst in a fluid which includes charged particles, and generating a magnetic field in the space wherein the semiconductor catalyst is disposed to impart electromagnetic induction energy to said charged particles, thereby enhancing the catalytic reaction of the semiconductor catalyst, wherein kinetic energy is imparted to the charged particles by means of microwave energy in the magnetic field.

12. A catalytic reaction apparatus comprising:

a semiconductor catalyst layer;

a fluid supplying and discharging means which introduces a fluid including charged particles to said catalyst layer and discharges the fluid;

a magnetic field generator which generates a magnetic field in the fluid; and an ultrasonic generator.

13. A method of enhancing a catalytic reaction, which comprises disposing a semiconductor catalyst in a fluid which includes charged particles, and generating a magnetic field in the space wherein the semiconductor catalyst is disposed to impart electromagnetic induction energy to said charged particles, thereby enhancing the catalytic reaction of the semiconductor catalyst, wherein the semiconductor catalyst includes titanium dioxide, activated carbon, and magnetite.

* * * * *